(12) United States Patent
Chang et al.

(10) Patent No.: US 7,486,354 B2
(45) Date of Patent: Feb. 3, 2009

(54) BACKLIGHT MODULE OF A LIQUID CRYSTAL DISPLAY, DISPLAY DEVICE, METHOD OF IMPROVING COLOR GAMUT OF A DISPLAY DEVICE

(75) Inventors: Chih-Li Chang, Tai-Nan (TW); Chi-Jen Huang, Tai-Chung (TW); Hung-Chen Kao, Tao-Yuan Hsien (TW); Ching-Cherng Sun, Tao-Yuan Hsien (TW); Cheng-Chung Lee, Tao-Yuan Hsien (TW)

(73) Assignee: HannStar Display Corp., Tao-Yuan Hsien (TW)

( * ) Notice: Subject to any disclaimer, the term of this patent is extended or adjusted under 35 U.S.C. 154(b) by 429 days.

(21) Appl. No.: 11/307,163

(22) Filed: Jan. 26, 2006

(65) Prior Publication Data
US 2007/0171186 A1    Jul. 26, 2007

(51) Int. Cl.
*G02F 1/1335* (2006.01)
(52) U.S. Cl. .............................. 349/106; 349/61; 349/62
(58) Field of Classification Search .................. 349/61, 349/62, 106
See application file for complete search history.

(56) References Cited

U.S. PATENT DOCUMENTS

| 4,487,481 A | * | 12/1984 | Suzawa ........................ 349/67 |
| 4,917,465 A | * | 4/1990 | Conner et al. ................... 349/5 |
| 5,737,045 A | * | 4/1998 | Abileah ....................... 349/104 |
| 5,803,579 A | * | 9/1998 | Turnbull et al. .............. 362/516 |
| 6,265,116 B1 | * | 7/2001 | Uchikawa et al. .............. 430/7 |

FOREIGN PATENT DOCUMENTS

| CN | 1598659 | | 3/2005 |
| CN | 1598659 A | * | 3/2005 |

* cited by examiner

*Primary Examiner*—Mike Qi
(74) *Attorney, Agent, or Firm*—Winston Hsu (57) ABSTRACT

A cut filter is used in a backlight module or a display device and positioned over the light source to filter off a part of the light comprising an overlap of at least two of the red light, the green light, and the blue light. By filtering off the overlapping part of light emitted from the light source to obtain a purer primary color light, the display device equipped with a conventional color filter can attain an improved color gamut.

24 Claims, 12 Drawing Sheets

BACKLIGHT MODULE OF A LIQUID CRYSTAL DISPLAY, DISPLAY DEVICE, METHOD OF IMPROVING COLOR GAMUT OF A DISPLAY DEVICE

BACKGROUND OF THE INVENTION

1. Field of the Invention

The present invention relates to a backlight module and a display device comprising the backlight module, and particularly to a backlight module, a display device comprising the same with an improved color gamut, and a method of improving the color gamut of the display device.

2. Description of the Prior Art

Due to the popularity of LCD TVs, large sized display panels for the next generation are widely and continuously developed. An LCD TV has the advantages of large size, good display qualities, high brightness, and wide view angle. The LCD panel does not emit light per se, and thus, the backlight module for the LCD TV plays an important role.

Conventional light sources for backlight modules comprise cold cathode fluorescent lamps (CCFL), external electrode fluorescent lamps (EEFL), light emitting diodes (LED), field emission devices (FED), and flat lamp plates. Most display products use a CCFL as a backlight. However, due to the limitations of the fluorescent material used in the lamp and the techniques, the display qualities, such as color gamut and full color, for the device using CCFL still need to be optimized.

Figure 1:
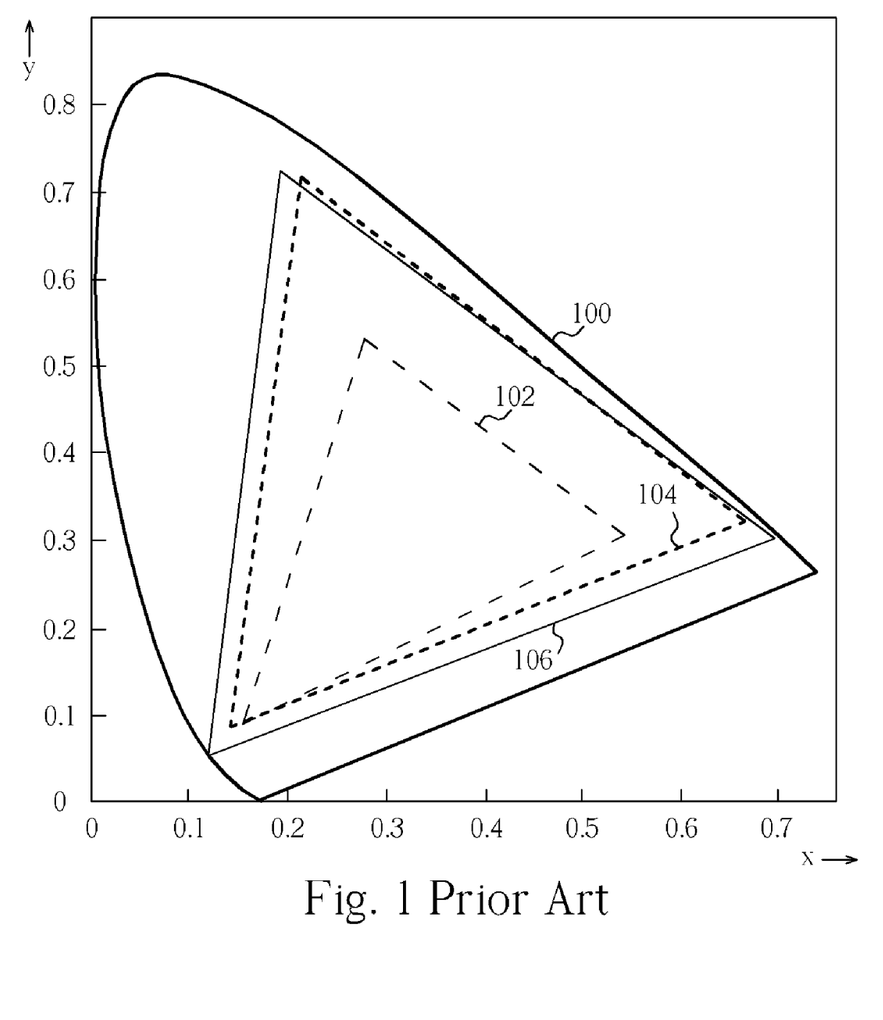
FIG. 1 shows an NTSC TV color gamut, a conventional CCFL backlight color gamut, and a conventional LED backlight color gamut represented using a CIE chromaticity diagram.

FIG. 1 shows various graphs for an NTSC TV color gamut, a conventional CCFL backlight color gamut, and a conventional LED backlight color gamut represented using a CIE chromaticity diagram. Pure, saturated spectral colors are mapped to the "horseshoe" shaped periphery of the visible gamut curve 100. The interior of the "horseshoe" contains all mappings of mixtures of colors, such as spectral red with added blue, which becomes magenta, for example. The interior of the horseshoe can also contain mixtures of pure colors with white, such as spectral red with added white, which becomes pink, for example. The overall color area defined by the "horseshoe" curve of visible gamut 100 is the full range of color that the human visual system can perceive. It is desirable to represent as much as possible of this area in a color display to come as close as possible to representing the original scene as it would be perceived by a human observer.

As shown in FIG. 1, the range of the CCFL backlight color gamut 102 is only 73% based on NTSC TV color gamut 104 (as 100%), and is not sufficient to attain a full color expression. The conventional LED backlight color gamut 106 has a relatively large range. However, when the LED is used with a conventional color filter in a liquid crystal display, the color gamut is deteriorated.

Figure 2:
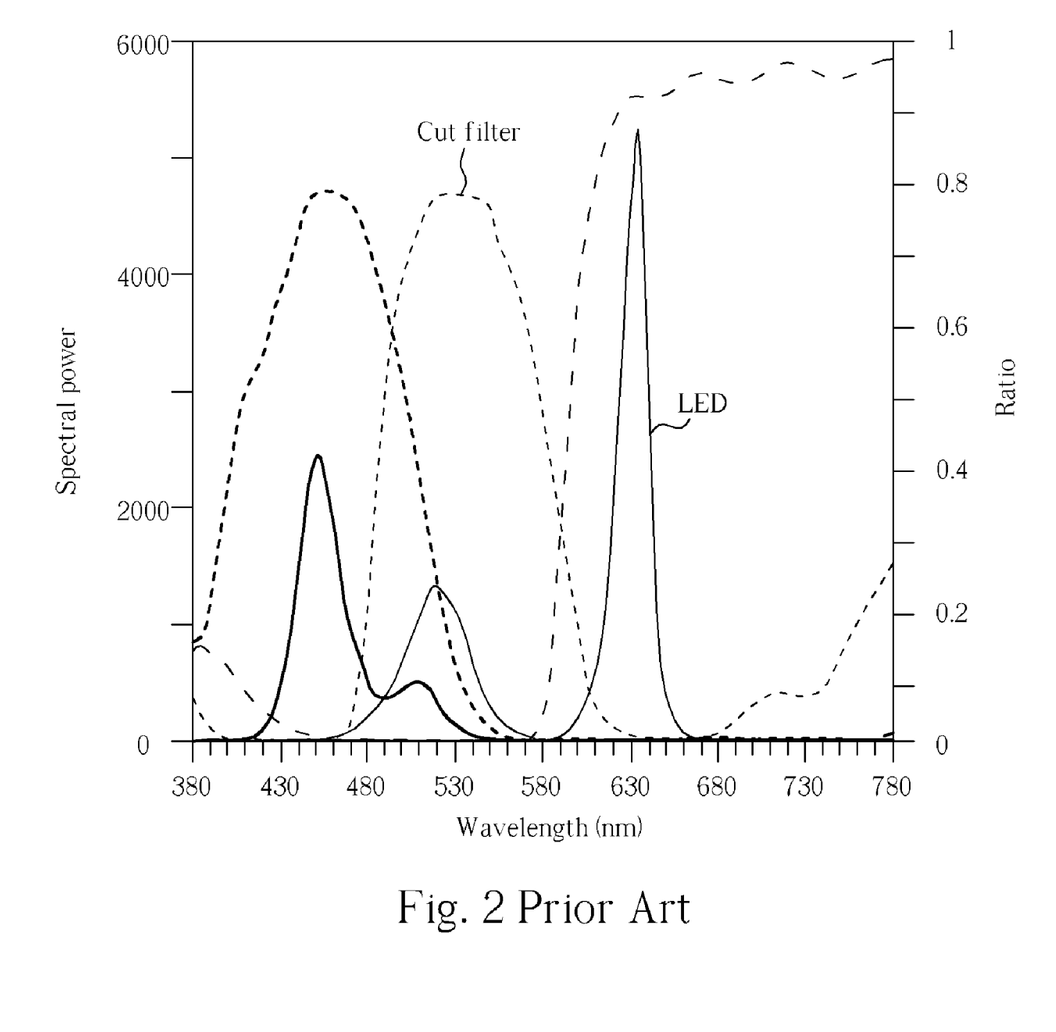
FIG. 2 shows a conventional RGB LED spectrum and a conventional color filter spectrum.
Figure 3:
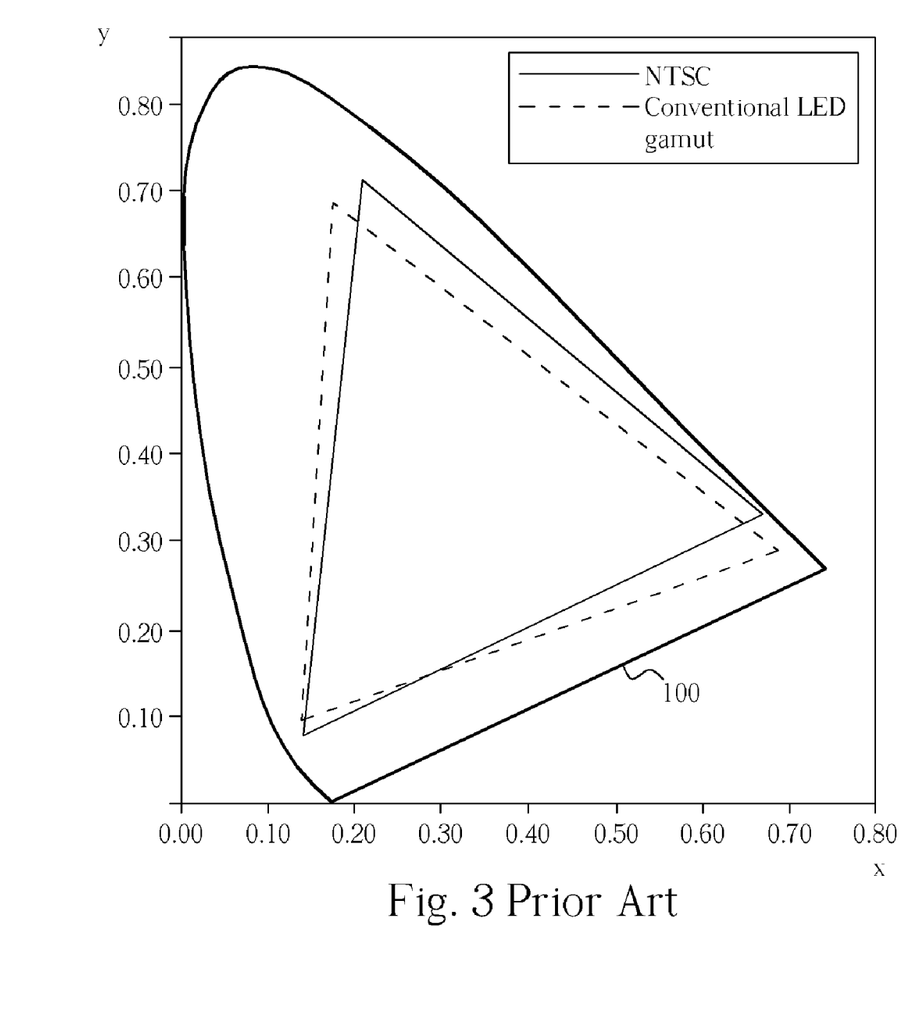
FIG. 3 shows an NTSC TV color gamut and a color gamut of the conventional LED backlight having a spectrum as shown in FIG. 2 represented using a CIE chromaticity diagram.

FIG. 2 shows a conventional RGB LED spectrum and a conventional color filter spectrum. As shown in FIG. 2, the RGB LED spectrum has narrower peaks than the color filter, such that the color expression for the LED is relatively pure as in comparison with the color filter. With respect to the color filter spectrum, a range of green light wavelengths overlaps with a range of blue light wavelengths in the shorter wavelength section, and thereby the color purity of light emission in this section is further reduced. When such LED is used as a light source in a backlight module, the gamut of the LED together with a color filter is determined to be about 99% of the NTSC TV gamut, in which the red light, green light, and blue light of the LED have a wavelength of 633 nm, 519 nm, and 450 nm, respectively, as shown in FIG. 3. Accordingly, the color saturation is not sufficiently improved simply by replacing CCFL with LED.

Therefore, there is still a need for a novel method to improve color gamut for better color saturation and a display device with improved color saturation.

SUMMARY OF THE INVENTION

It is an object of the present invention to provide a backlight module of a liquid crystal display for providing a light to the liquid crystal display for forming a color image having a broad color gamut.

It is another object of the present invention to provide a display device for forming a color image having a broad color gamut.

It is still another object of the present invention to provide a method of improving color gamut of a display device for forming a color image having a broad color gamut.

The backlight module of a liquid crystal display according to the present invention comprises a housing, a light source, and a cut filter. The light source is positioned in the housing for emitting a light comprising a red light, a green light, and a blue light. The cut filter is positioned over the light source to filter off a part of the light comprising an overlap of at least two of the red light, the green light, and the blue light.

The display device according to the present invention comprises a backlight module, a display panel, and a cut filter. The backlight module comprises a housing; and a light source positioned in the housing for emitting a light comprising a red light, a green light and a blue light. The display panel is positioned over the backlight module and comprises a TFT array substrate and a color filter substrate. The cut filter is positioned over the backlight module to filter off a part of the light comprising an overlap of at least two of the red light, the green light, and the blue light.

The method of improving color gamut of a display device according to the present invention is carried out in a display device comprising a light source to emit a light, a TFT array substrate and a color filter substrate to form a display panel. The method comprises steps as follows. First, a spectrum for the light emitted from the light source is obtained by a spectrometer, wherein the spectrum for the light has a first range of wavelengths for a red light, a second range of wavelengths for a green light, and a third range of wavelengths for a blue light. At least a fourth range of wavelengths for the spectrum comprising an overlap of at least two of the first range of wavelengths for the red light, the second range of wavelengths for the green light, and the third range of wavelengths for the blue light is determined. Finally, at least one cut filter is provided to filter off the fourth range of wavelengths of the light, such that the color gamut of the display device is improved.

It is an advantage of the present invention that it provides a backlight module, a display device, and a method capable of achieving enhanced color gamut for displaying images, especially in comparison with a conventional backlight module using a light source such as CCFL or LED with a conventional color filter together. By filtering off the overlapping part of the green light and the blue light or the red light and the green light emitted from the light source, the remaining light passing through the color filter results in an isolated purer primary color light, and thus the color gamut for the display is enhanced and the color reproduction is easily achieved.

These and other objectives of the present invention will no doubt become obvious to those of ordinary skill in the art after reading the following detailed description of the preferred embodiment that is illustrated in the various figures and drawings.

DETAILED DESCRIPTION

Referring back to the gamut mapping arrangement shown in FIG. 1, it is instructive to mention that a basic strategy for expanding the gamut of a display is to use color sources that are on or close to the periphery of the visible gamut horseshoe. Accordingly, a pure red, green, or blue color light is desired. The conventional color filter is detected to have broad and overlapping bands for impure red, green, and blue light to pass through, as shown by the spectrum in FIG. 2, and accordingly the purity of the resulting light is worsened by the color filter. Therefore, in the present invention, a cut filter is placed in the light path of the LED to filter off the overlapping section of the green light and the blue light or the green light and the red light in advance to result in a purer primary color light, and such that a color gamut for the display is improved.

Figure 4A:
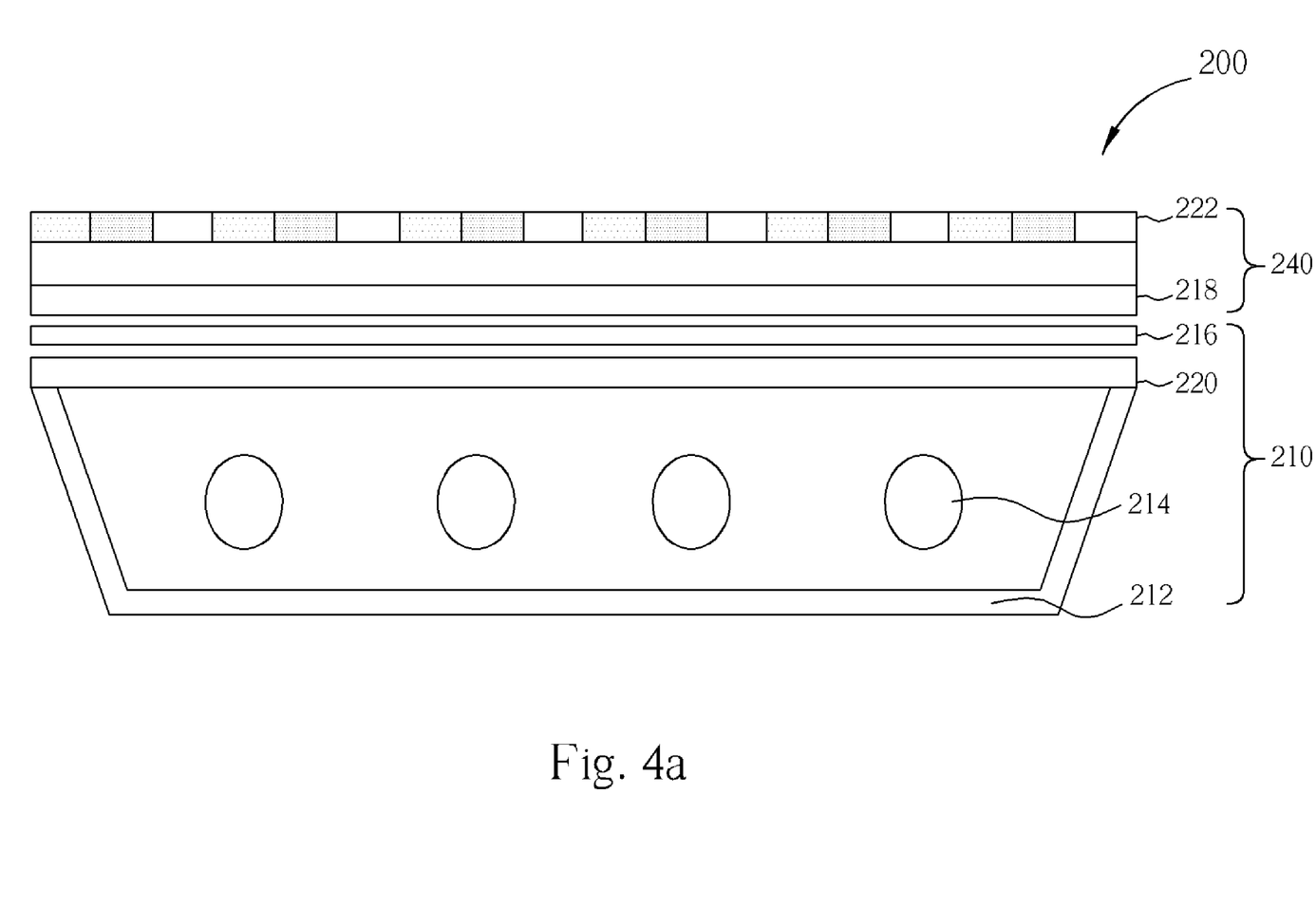
FIGS. 4a to 4f show respectively a backlight module and a display device comprising the backlight module of embodiments according to the present invention.
Figure 4B:
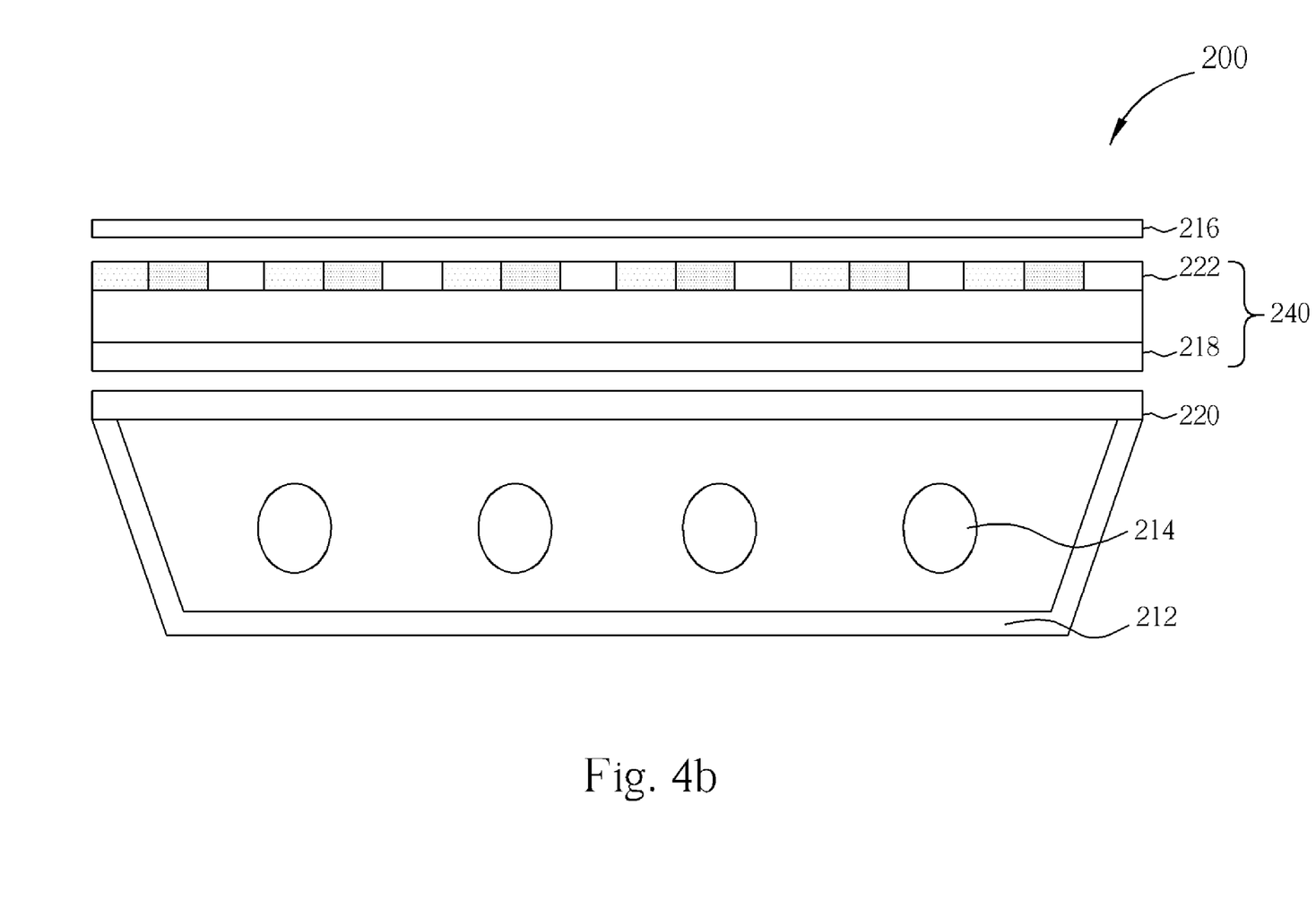

Please refer to FIG. 4a showing a display device comprising the backlight module and a liquid crystal display panel. The backlight module 210 comprises a housing 212, a light source 214, and a cut filter 216. The light source 214 is positioned in the housing 212 for emitting a light comprising a red light, a green light, and a blue light. The light source used in the present invention is not limited and may be, for example, CCFL, EEFL, LED (especially RGB LED or white light LED), FED, and flat lamp plates. The cut filter 216 is positioned over the light source to filter off a part of the light. The part of the light to be filtered off comprises an overlap of at least two of the red light, the green light, and the blue light, that is, a part of light with a range of wavelengths being an overlap of the red light and the green light, or an overlap of the green light and the blue light. Thus, the color of the red, green, and blue lights is relatively pure, and a larger color gamut can be attained.

The part of the light to be filtered off is not strictly limited to the whole of the overlap section, but may be regulated according to the display qualities as desired. Generally, a theory of FWHM (full-width half maximum) may be applied to attain a theoretical maximal section to be filtered off. That is to say, the overlap to be filtered off may have a range of wavelengths between the wavelength at the half maximum intensity of the blue light and the wavelength at the half maximum intensity of the green light, both being adjacent to each other, or between the wavelength at the half maximum intensity of the green light and the wavelength at the half maximum intensity of the red light, both being adjacent to each other.

The part of the light to be filtered off may be determined as follows. First, a spectrum for the light emitted from the light source is determined by a spectrometer. The spectrum for the light comprises a red light peak, a green light peak, and a blue light peak. Next, at least a range of wavelengths in the spectrum comprising an overlap of at least two of the red light peak, the green light peak, and the blue light peak can be observed and can be determined as the part of the light to be filtered off.

The part of the light to be filtered off may be also determined as follows. First, a spectrum for the light after passing the display panel, the color filter, or both is obtained. The spectrum for the light comprises a red light peak, a green light peak, and a blue light peak. Alternatively, a spectrum for the light emitted from the light source and a spectrum for the color filter are obtained by a spectrometer. The two spectra are added up to have a red light peak, a green light peak, and a blue light peak. Next, at least a range of wavelengths for the spectrum comprising an overlap of at least two of the red light peak, the green light peak, and the blue light peak can be observed and can be determined as the part of the light to be filtered off.

Figure 5:
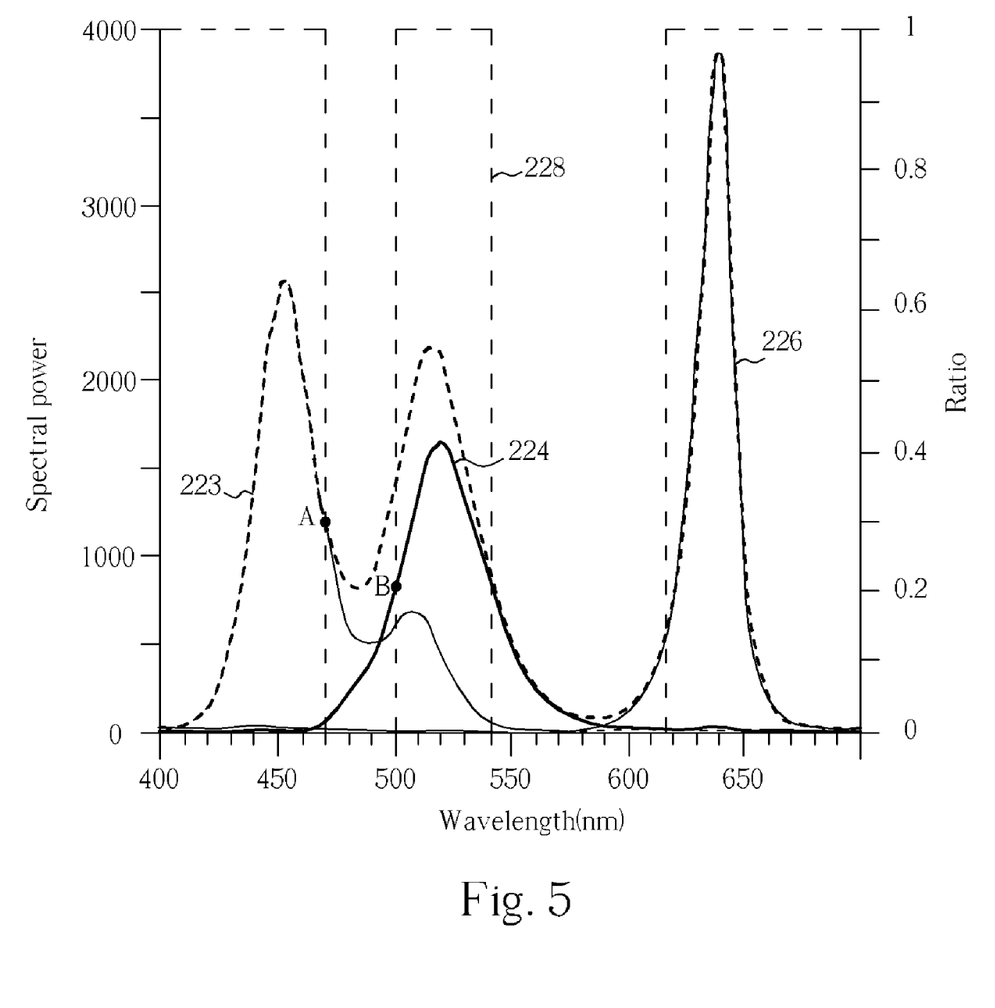
FIG. 5 shows spectra of a set of RGB LEDs and a color filter in accordance with the present invention.

Please refer to FIG. 5 showing a spectrum of a set of RGB LEDs emitting a blue light 223, a green light 224, and a red light 226. As shown in FIG. 5, the blue light 223 overlaps with the green light 224. Such overlap makes the color light less pure. A cut filter is designed accordingly to filter off the part of overlap for increasing purity of the color light in accordance with the present invention. For example, the cut filter may have a spectrum as the curve 228 shown in FIG. 5. Thus, a range of light with a wavelength from 470 nm to 500 nm and a range of light with a wavelength from 542 nm to 616 nm are filtered off. The wavelength 470 nm is the wavelength for point A at the full-width at the half maximal intensity of the peak of the blue light. The wavelength 500 nm is the wavelength for point B at the full-width at the half maximal intensity of the peak of the green light. That is, the part of the light between point A and point B, which contains overlap of the blue light and the green light, is filtered off in this embodiment. While, the range of light with a wavelength from 542 nm to 616 nm filtered off is the part with intensity less than half maximal intensity of the green light or the red light.

Figure 6:
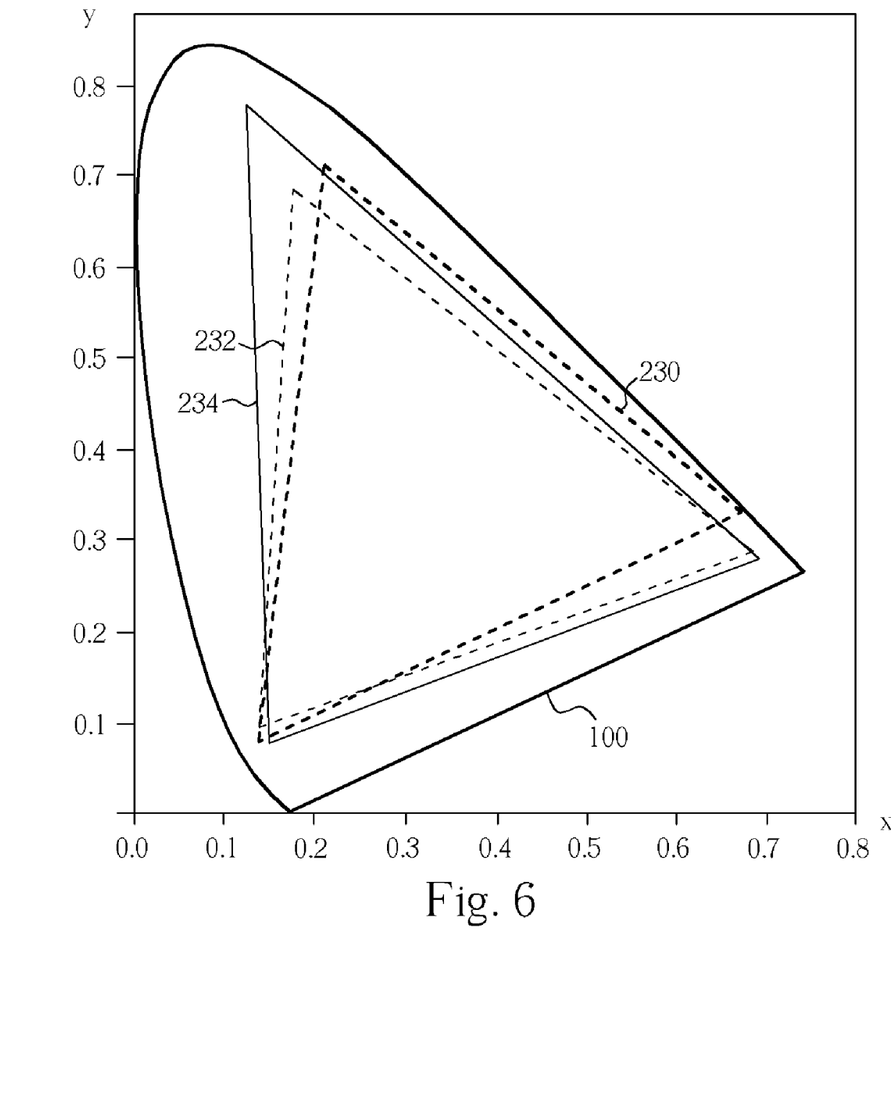
FIG. 6 shows an NTSC TV color gamut, a color gamut of the set of RGB LED, and a color gamut of the set of RGB LEDs with the cut filter positioned thereover represented using a CIE chromaticity diagram.

FIG. 6 shows various graphs for an NTSC TV color gamut 230, a color gamut 232 of the set of RGB LED, and a color gamut 234 of the set of RGB LEDs with the cut filter positioned thereover represented using a CIE chromaticity diagram. The color gamut 232 of the set of RGB LEDs is about 99.79% of the NTSC TV color gamut. The color gamut 234 of the set of RGB LEDs with the cut filter positioned thereover is about 120% of the NTSC TV color gamut. Thus, the color gamut is improved remarkably according to the method of the present invention.

Figure 7:
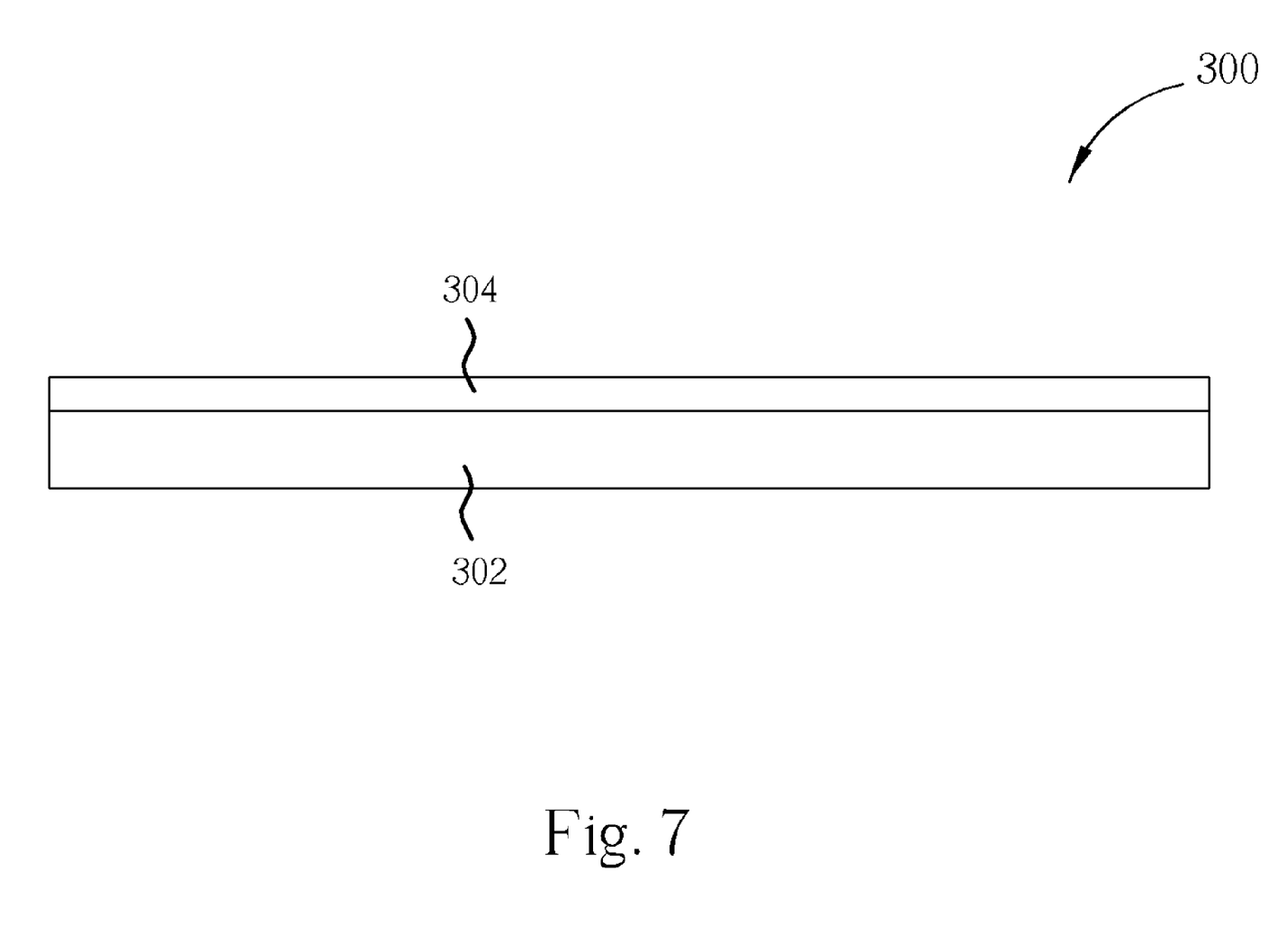
FIG. 7 shows an embodiment of a cut filter according to the present invention.

The cut filter used in the present invention is a light filter which can filter off unwanted portion of the light passing therethrough by means of light reflection or light absorbance. For example, the cut filter may comprise one or more metal oxide layers coated on a substrate, such as glass, and be placed over the light source in the backlight module. The metal oxide layer has a thickness and a refraction index corresponding to the wavelength of the light to be filtered off. In case that two or more parts of light are desired to filtered off, two or more cut filters may be needed. The two or more cut filters may be formed on a same side or different sides of a substrate or on different substrates. FIG. 7 shows an embodiment of a cut filter. The cut filter 300 comprises a glass plate 302 as a substrate and a metal oxide film 304 coated on the glass plate 302. The thickness of the film is generally from 1 to 10 μm, but not limited thereto, depending on the wavelength of the light to be filtered off.

When the backlight module comprises a set of optical films, such as a diffusion plate, a prism sheet, and a light guide plate, etc., generally positioned over the light source, the cut filter may be placed between the light source and the set of optical films, over the set of optical film sets, or coated on one of the optical films, such as a diffusion plate, a prism sheet, and a light guide plate.

Figure 4C:
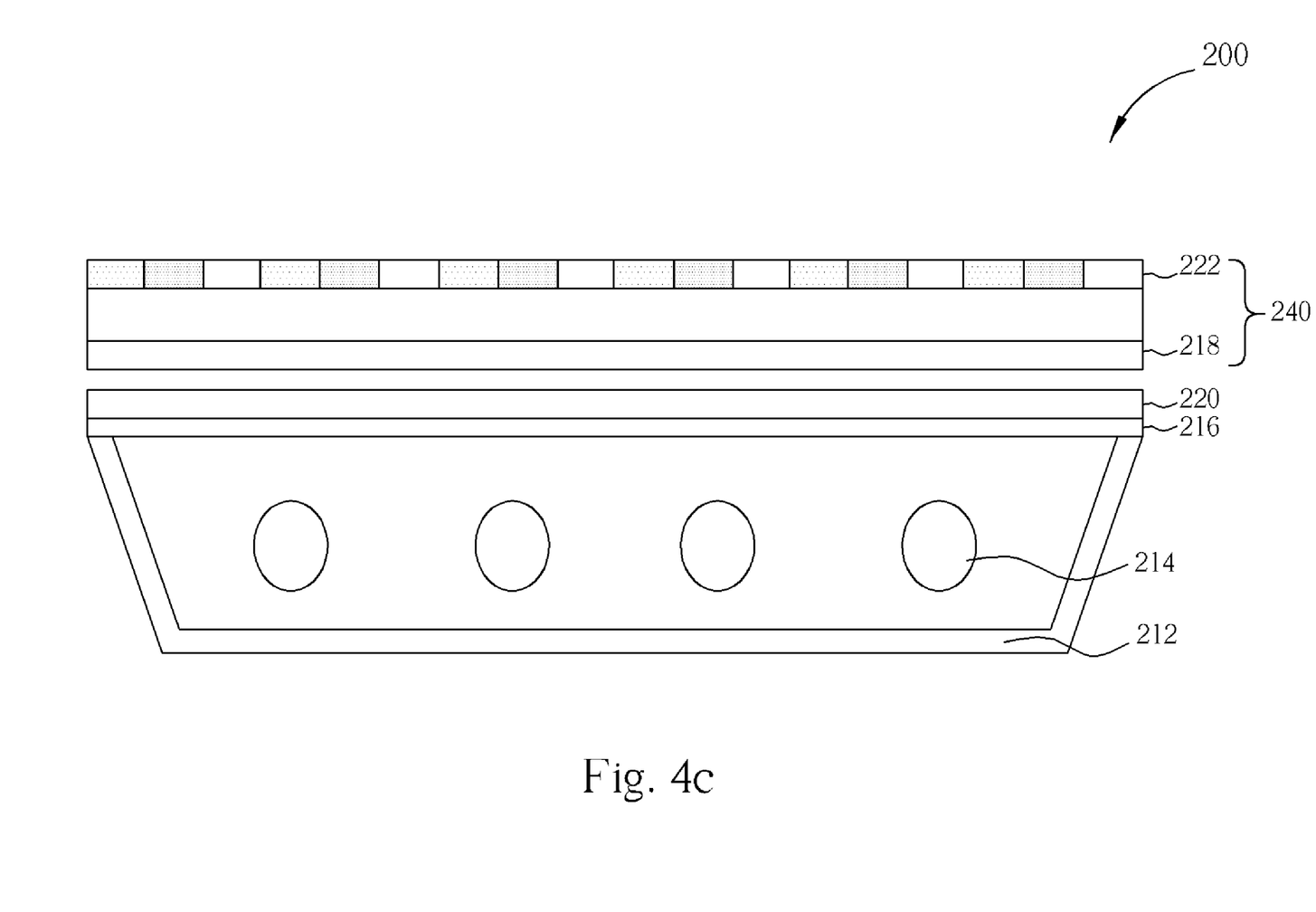

Referring back to FIG. 4a, an optical film 220 is placed over the light source 214 in the backlight module 210 or the display device 200. In this embodiment, the cut filter 216 is placed over the optical film 220. Referring to FIG. 4c, the cut filter 216 is placed between the optical film 220 and the light source 214 in the backlight module.

With respect to a feature of the present invention, referring to FIGS. 4a to 4f, the display device comprises the backlight module, a cut filter 216, and a display panel 240 comprising a TFT (thin film transistor) array substrate 218 and a color filter substrate 222. The cut filter 216 may be placed in various positions as soon as in the light path for the outgoing light form the light source to filter off one or more undesired portions of light.

Figure 4D:
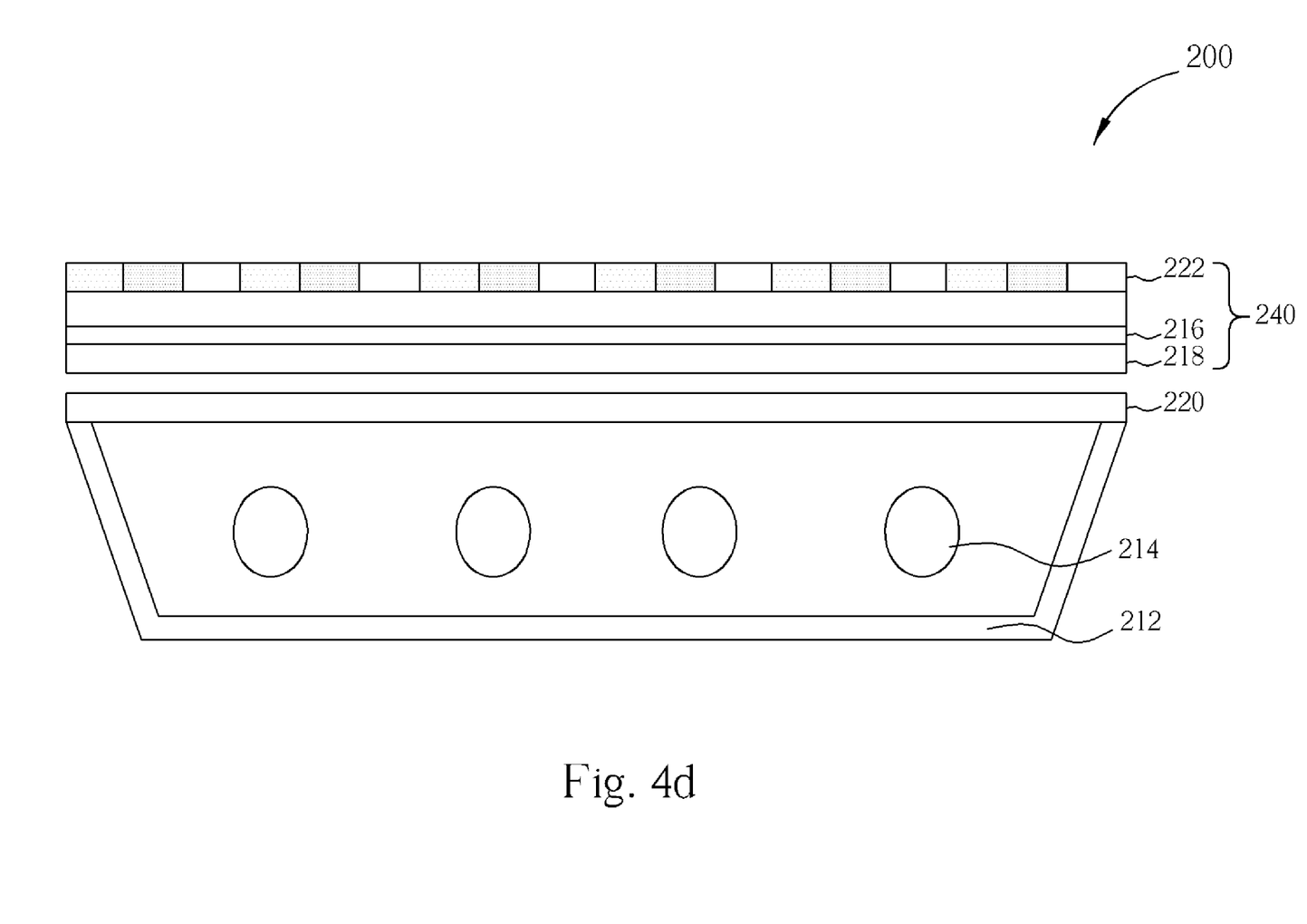
Figure 4E:
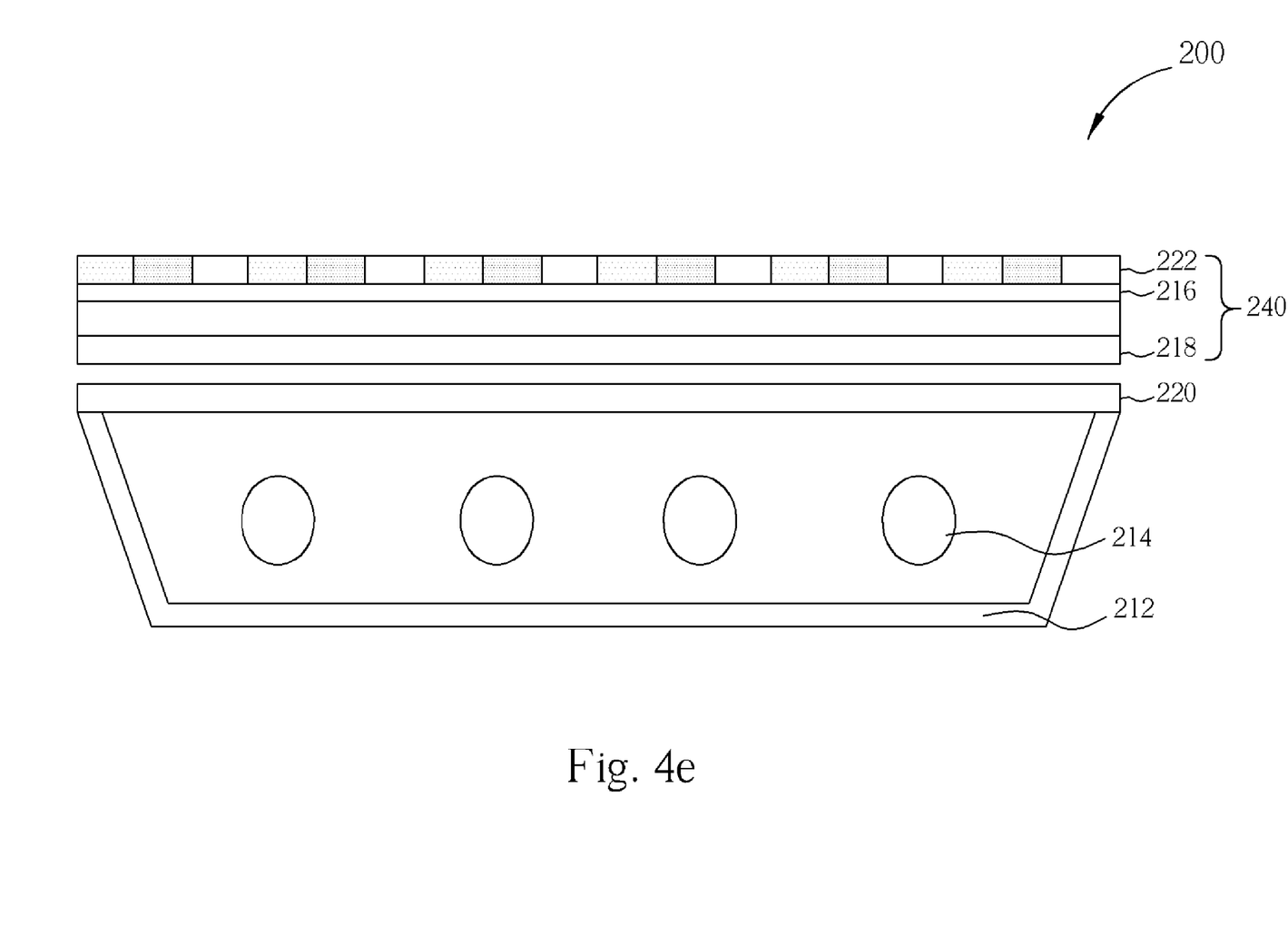
Figure 4F:
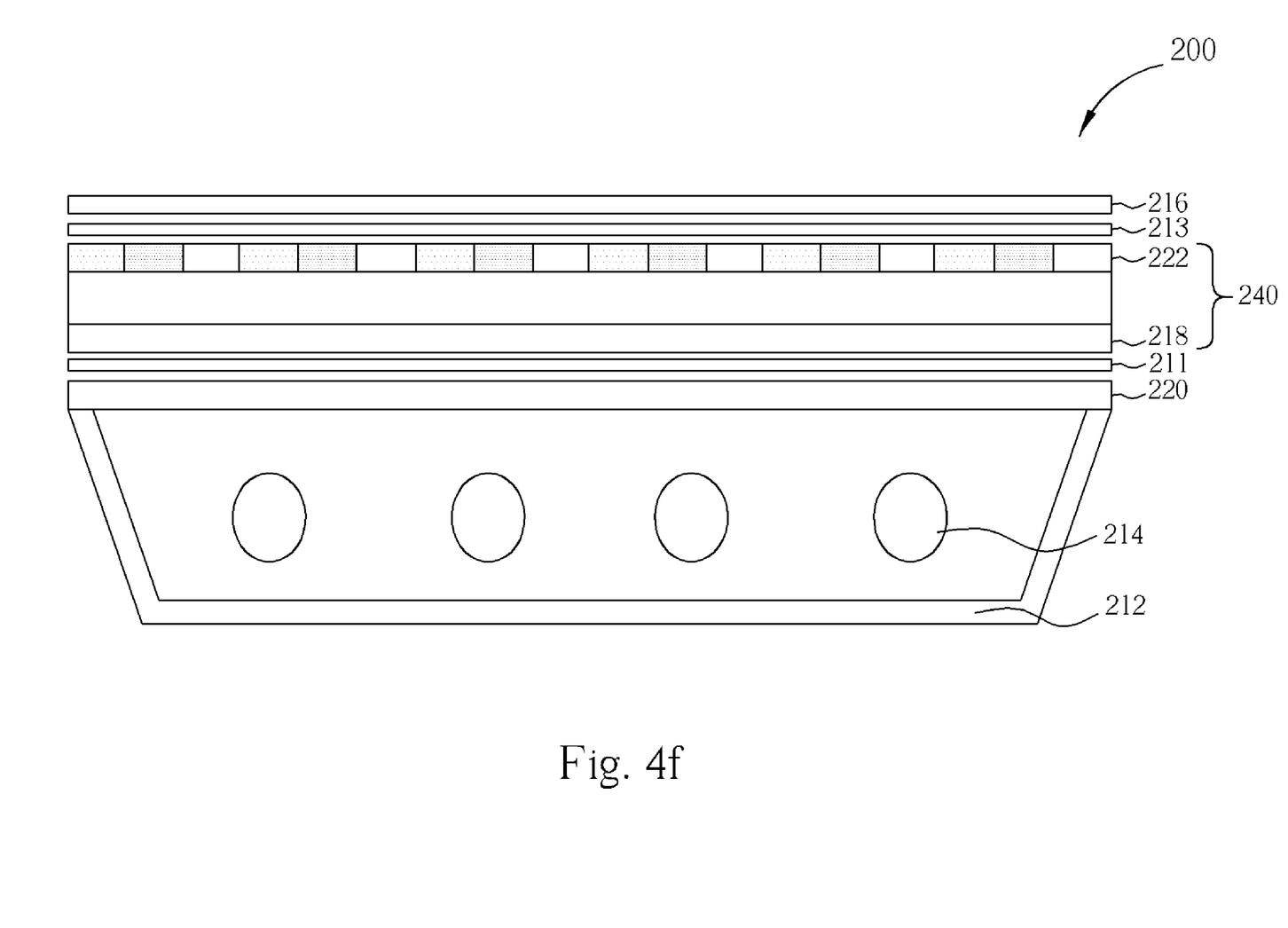

The cut filter 216 comprised in the display device 200 may be positioned over the light source 214, for example, between the optical film 220 and the display panel 240 (FIG. 4a), over the color filter substrate 222 of the display panel 240 (FIG. 4b), between the optical film 220 and the light source 214 (FIG. 4c), or between the TFT substrate 218 and the color filter substrate 222 inside the display panel 240 (FIGS. 4d and 4e). In addition, the cut filter 216 may coated on the optical film 220 or the display panel 240 such as on the TFT substrate 218 or the color filter substrate 222, inside or outside. The display device may further comprise a polarizer and the cut filter may be coated on the polarizer. As shown in FIG. 4f, the display device 200 further comprises a polarizer 213 over the color filter substrate 222 and a polarizer 211 beneath the TFT substrate 218, and the cut filter 216 is over the polarizer 213 or beneath the polarizer 211. And the cut filter 216 may be coated on the polarizer. It is easy and efficient to achieve an improved color gamut for a display device using the device and method according to the present invention.

All combinations and sub-combinations of the above-described features also belong to the present invention. Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module of a liquid crystal display, comprising:
   a housing;
   a light source positioned in the housing for emitting a light comprising a red light, a green light and a blue light; and
   a cut filter positioned over the light source to filter off a part of the light comprising an overlap of at least two of the red light, the green light, and the blue light, wherein the cut filter comprises at least one metal oxide film deposited on a substrate and the metal oxide film has a thickness and a refraction index corresponding to the wavelength of the light to be filtered off.

2. The backlight module of a liquid crystal display of claim 1, wherein the overlap has a range of wavelengths between the wavelength at the half maximum intensity of the blue light and the wavelength at the half maximum intensity of the green light, both being adjacent to each other, or between the wavelength at the half maximum intensity of the green light and the wavelength at the half maximum intensity of the red light, both being adjacent to each other.

3. The backlight module of a liquid crystal display of claim 1, further comprising an optical film set.

4. The backlight module of a liquid crystal display of claim 3, wherein the cut filter is positioned over the optical film set.

5. The backlight module of a liquid crystal display of claim 3, wherein the cut filter is positioned on the optical film set.

6. The backlight module of a liquid crystal display of claim 3, wherein the optical film set comprises at least one selected from the group consisting of a diffusion plate, a prism sheet, and a light guide plate.

7. The backlight module of a liquid crystal display of claim 3, wherein the cut filter is coated on the optical film set.

8. The backlight module of a liquid crystal display of claim 1, wherein the light source comprises a cold cathode fluorescent lamp, a light emitting diode, an external electrode lamp, a field emission devices, or a flat lamp plate.

9. A display device, comprising:
   a backlight module, comprising:
      a housing; and
      a light source positioned in the housing for emitting a light comprising a red light, a green light and a blue light;
   a display panel positioned over the backlight module, comprising a TFT array substrate and a color filter substrate; and
   a cut filter positioned over the backlight module to filter off a part of the light comprising an overlap of at least two of the red light, the green light, and the blue light, wherein the cut filter comprises at least one metal oxide film deposited on a substrate and the metal oxide film has a thickness and a refraction index corresponding to the wavelength of the light to be filtered off.

10. The display device of claim 9, wherein the overlap has a range of wavelengths between the wavelength at the half maximum intensity of the blue light and the wavelength at the half maximum intensity of the green light, both being adjacent to each other, or between the wavelength at the half maximum intensity of the green light and the wavelength at the half maximum intensity of the red light, both being adjacent to each other.

11. The display device of claim 9, wherein the cut filter is positioned between the backlight module and the display panel.

12. The display device of claim 9, wherein the cut filter is positioned on the display panel.

13. The display device of claim 9, wherein the cut filter is coated on the display panel.

14. The display device of claim 9, wherein the cut filter is coated on the color filter substrate.

15. The display device of claim 9, wherein the cut filter is coated on the TFT array substrate.

16. The display device of claim 9, further comprising a polarizer positioned on the display panel, and the cut filter is coated on the polarizer.

17. The display device of claim 9, further comprising an optical film set positioned on the backlight module.

18. The display device of claim 17, wherein the optical film set comprises at least one selected from the group consisting of a diffusion plate, a prism sheet, and a light guide plate.

19. The display device of claim 17, wherein the cut filter is coated on the optical film set.

20. The display device of claim 9, wherein the light source comprises a cold cathode fluorescent lamp, a light emitting diode, an external electrode lamp, a field emission devices, or a flat lamp plate.

21. A method of improving color gamut of a display device comprising a light source to emit a light, a TFT array substrate and a color filter substrate to form a display panel, comprising:

obtaining a spectrum for the light emitted from the light source by a spectrometer, wherein the spectrum for the light has a first range of wavelengths for a red light, a second range of wavelengths for a green light, and a third range of wavelengths for a blue light;

determining at least a fourth range of wavelengths for the spectrum comprising an overlap of at least two of the first range of wavelengths for the red light, the second range of wavelengths for the green light, and the third range of wavelengths for the blue light; and providing at least one cut filter to filter off the fourth range of wavelengths of the light, such that the color gamut of the display device is improved, wherein the cut filter comprises at least one metal oxide film having a thickness and a refraction index corresponding to the wavelength of the light to be filtered off.

22. The method of claim 21, wherein the spectrum of the light is obtained after the light emitted from the light source further passes the display panel.

23. The method of claim 21, wherein the spectrum of the light is obtained by adding a first spectrum of the light emitted from the light source to a second spectrum of the display panel.

24. The method of claim 21, wherein the overlap has a range of wavelengths between the wavelength at the half maximum intensity of the blue light and the wavelength at the half maximum intensity of the green light, both being adjacent to each other, or between the wavelength at the half maximum intensity of the green light and the wavelength at the half maximum intensity of the red light, both being adjacent to each other.

* * * * *